US006253666B1

(12) United States Patent
Wong

(10) Patent No.: US 6,253,666 B1
(45) Date of Patent: Jul. 3, 2001

(54) TURNING STRUCTURE OF A BAKING EQUIPMENT

(76) Inventor: Roderick Wong, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/677,798

(22) Filed: Sep. 29, 2000

(51) Int. Cl.[7] .............................. A21B 1/46; A21D 8/00; A21C 11/00; A23L 1/00; A47J 37/00

(52) U.S. Cl. ............................ 99/443 C; 99/386; 99/477

(58) Field of Search ............................. 99/340, 339, 360, 99/365, 367, 371, 386, 423, 427, 443 R, 443 C, 477–479; 134/132; 219/388, 400; 126/21 A; 432/142, 145, 152, 128, 121

(56) References Cited

U.S. PATENT DOCUMENTS 1,177,502 * 3/1916 Ewald .................................. 99/365
2,930,310 * 3/1960 Poppenburg .......................... 99/479
3,494,305 * 2/1970 Pachyn ................................ 99/427
3,802,832 * 4/1974 Nicolaus ............................ 432/128
3,830,624 * 8/1974 Sperring et al. ................ 432/145 X
3,908,533 * 9/1975 Fagerstrom et al. .................. 99/386
4,079,666 * 3/1978 Plemons ............................ 99/386 X
4,120,646 * 10/1978 Groff et al. ...................... 432/121 X
4,514,167 * 4/1985 Royer ................................ 99/443 C
4,882,981 * 11/1989 Bacigalupe ......................... 99/479 X
5,109,758 * 5/1992 Voegtlin ............................ 99/443 C

* cited by examiner

*Primary Examiner*—Timothy F. Simone

(57) ABSTRACT

A baking equipment has an oven to bake an article which was dipped in a resin, a sealing box, and a plurality of heating devices and a turning structure disposed in the sealing box. The turning structure has a pair of transporting devices and a pair of air-cushioning devices disposed in the transporting devices.

1 Claim, 2 Drawing Sheets

TURNING STRUCTURE OF A BAKING EQUIPMENT

BACKGROUND OF THE INVENTION

The present invention relates to a turning structure of a baking equipment. More particularly, the present invention relates to a turning structure which has a pair of transporting devices and a pair of air-cushioning devices.

Referring to FIG. 1, a conventional baking equipment has an oven B to bake an article A which was dipped in a resin, a pair of air-pressuring boxes E, a cooling device C, a sealing box F, and a plurality of transporting devices D. When the article A passes through the transporting devices D, the surface of the article A will be damaged while the article contacts one of the transporting devices D. Therefore, the cooling device C is required to decrease a surface temperature of the article A. However, the producing efficiency and the energy efficiency are decreased significantly.

SUMMARY OF THE INVENTION

An object of the present invention is to provide a turning structure which has a pair of transporting devices and a pair of air-cushioning devices disposed in the transporting devices in order to provide an air-cushioning function for an article.

Accordingly, a baking equipment comprises an oven to bake an article, a sealing box, and a plurality of heating devices and a turning structure disposed in the sealing box. The turning structure has a pair of transporting devices and a pair of air-cushioning devices disposed in the transporting devices.

DETAILED DESCRIPTION OF THE INVENTION

Figure 1:
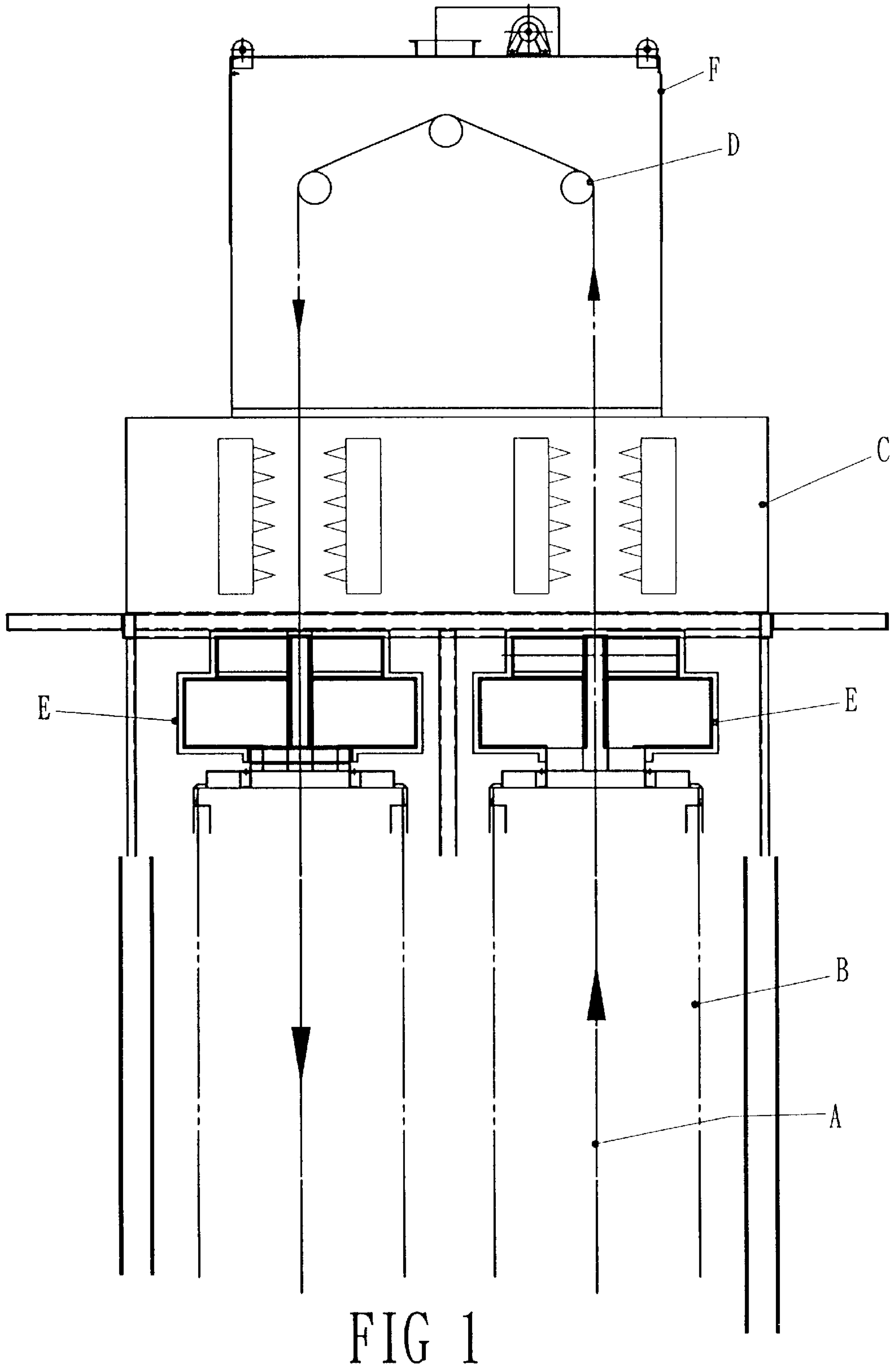
FIG 1 PRIOR ART
FIG. 1 is a schematic view of a conventional baking equipment of the prior art.
Figure 2:
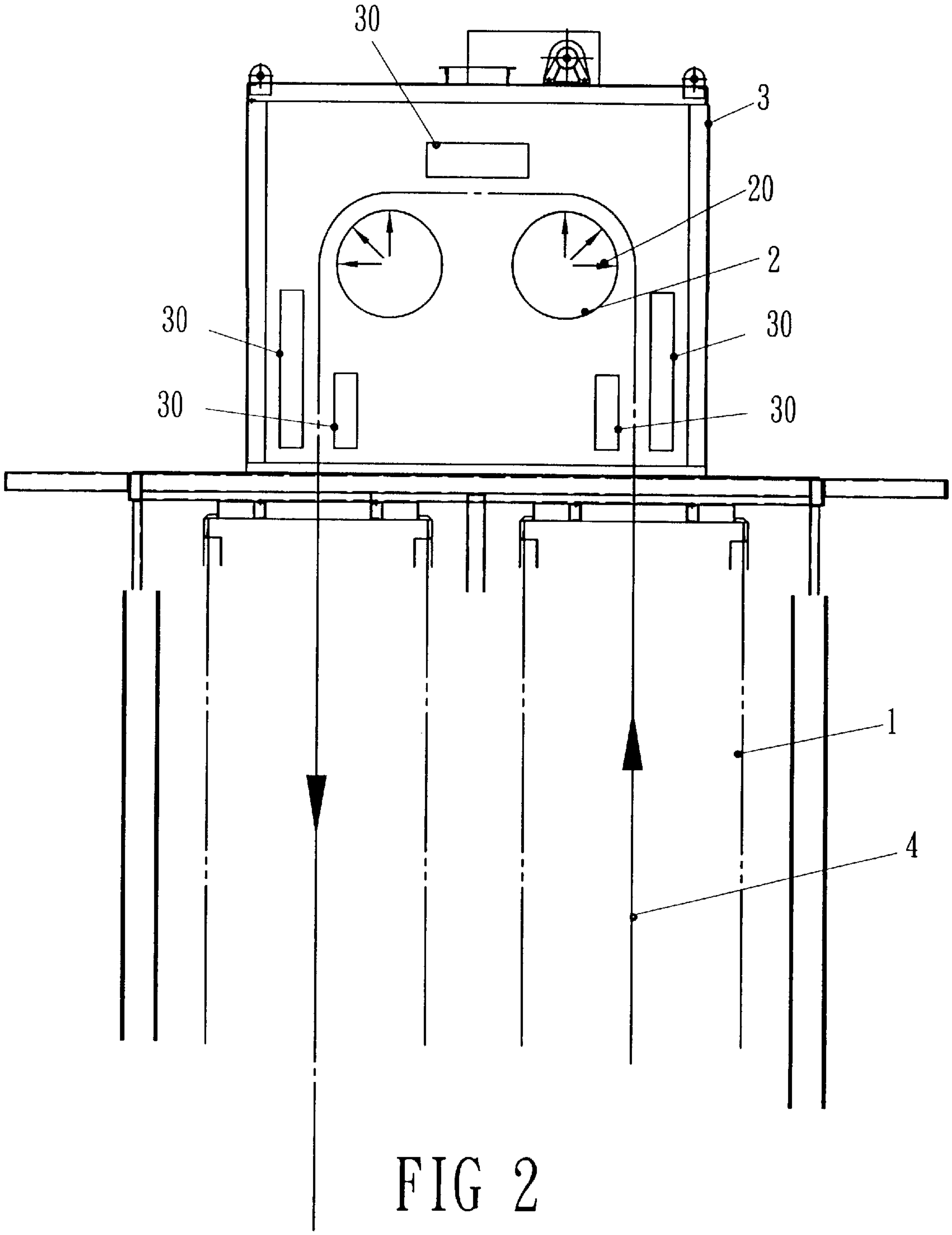
FIG. 2 is a schematic view of a baking equipment of a preferred embodiment in accordance with the present invention.

Referring to FIG. 2, a baking equipment comprises an oven 1 to bake an article 4 which was dipped in a resin, a sealing box 3, and a plurality of heating devices 30 and a turning structure disposed in the sealing box 3.

The turning structure has a pair of transporting devices 2 and a pair of air-cushioning devices 20 disposed in the transporting devices 2.

The air-cushioning devices 20 produce high-pressure air to blow the article A in order to provide an air-cushioning function for the article A so that the article A will not contact the transporting devices 2.

Therefore, the surface temperature of the article A need not be decreased. Thus the producing efficiency and the energy efficiency are increased significantly.

The present invention is not limited to the above embodiment but various modification thereof may be made. Furthermore, various changes in form and detail may be made without departing from the scope of the present invention.

I claim:

1. A baking equipment comprising an oven to bake an article, a sealing box, and a plurality of heating devices and a turning structure disposed in the sealing box, characterized in that:

- the turning structure has a pair of transporting devices and a pair of air-cushioning devices disposed in the transporting devices, and
- the air-cushioning devices produce high-pressure air to blow the article.

* * * * *